(12) United States Patent
Mano et al.

(10) Patent No.: US 12,244,246 B2
(45) Date of Patent: Mar. 4, 2025

(54) POWER CONVERSION DEVICE, IMAGE FORMING APPARATUS, AND POWER CONVERSION CONTROL METHOD

(71) Applicants: Tsuyoshi Mano, Tokyo (JP); Junpei Hosoya, Kanagawa (JP)

(72) Inventors: Tsuyoshi Mano, Tokyo (JP); Junpei Hosoya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 77 days.

(21) Appl. No.: 18/122,727

(22) Filed: Mar. 17, 2023

(65) Prior Publication Data

US 2023/0308031 A1    Sep. 28, 2023

(30) Foreign Application Priority Data

Mar. 23, 2022   (JP) ................................ 2022-046578

(51) Int. Cl.
*H02M 7/538* (2007.01)
*H02M 1/00* (2006.01)
*H02M 1/04* (2006.01)

(52) U.S. Cl.
CPC ..... *H02M 7/53803* (2013.01); *H02M 1/0009* (2021.05); *H02M 1/0012* (2021.05); *H02M 1/042* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225;
(Continued)

(56) References Cited

U.S. PATENT DOCUMENTS 10,608,570 B2 * 3/2020 Ogura ................ H02M 1/4225
2002/0024828 A1 * 2/2002 Hayashi ............. H02M 5/4505
363/35

(Continued)

FOREIGN PATENT DOCUMENTS

JP    2001-209231    8/2001
JP    2006-211877    8/2006

*Primary Examiner* — Sean Kayes
*Assistant Examiner* — Nusrat Quddus
(74) *Attorney, Agent, or Firm* — XSENSUS LLP

(57) ABSTRACT

A power conversion device includes a power conversion circuit, a memory, a voltage detection circuit, a current detection circuit, and a control circuit. The power conversion circuit controls a switching device based on a switching pulse signal to convert direct current power into alternating current power and output the alternating current power to a power supply target. The memory stores an alternating current phase difference. The voltage detection circuit detects an alternating current voltage effective value. The current detection circuit detects an alternating current effective value. Based on the alternating current phase difference, the alternating current voltage effective value, and the alternating current effective value, the control circuit stops output of the switching pulse signal at a time when an alternating current has a value of 0.

13 Claims, 7 Drawing Sheets

(58) Field of Classification Search
CPC .......... G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H05B 39/048; B23K 11/24; H04B 2215/069; Y02B 70/1491

See application file for complete search history.

(56) References Cited

U.S. PATENT DOCUMENTS

| | | | | |
|---|---|---|---|---|
| 2008/0231208 A1* | 9/2008 | Kimura | .............. | H05B 41/3927 315/277 |
| 2011/0019322 A1* | 1/2011 | Akama | ................. | H02M 3/156 363/126 |
| 2012/0106218 A1* | 5/2012 | Awane | ................. | H02M 1/4225 363/127 |
| 2013/0058144 A1* | 3/2013 | Hiramatsu | .............. | H02M 7/48 363/131 |
| 2014/0125264 A1* | 5/2014 | Nakamura | ................. | H02P 6/10 318/400.23 |
| 2015/0138851 A1* | 5/2015 | Yonezawa | ........... | H02M 1/4225 363/44 |
| 2017/0207718 A1* | 7/2017 | Shimomugi | ............ | H02M 1/42 |
| 2018/0367021 A1 | 12/2018 | Mano | | |
| 2019/0238076 A1* | 8/2019 | Yamazaki | .............. | G03G 21/14 |
| 2019/0369536 A1* | 12/2019 | Mano | ................. | H02M 3/33571 |
| 2020/0014308 A1* | 1/2020 | Tokusaki | .............. | H02M 5/293 |
| 2020/0110353 A1* | 4/2020 | Kashiwakura | ..... | G03G 15/2025 |
| 2020/0136541 A1* | 4/2020 | Morita | ..................... | B65H 7/06 |
| 2020/0158905 A1* | 5/2020 | Kwack | ..................... | H05B 6/06 |
| 2020/0242434 A1 | 7/2020 | Mano | | |
| 2020/0310326 A1* | 10/2020 | Kakutani | ........... | G03G 15/5004 |
| 2020/0357598 A1* | 11/2020 | Demura | ................. | H01J 35/24 |
| 2021/0249963 A1* | 8/2021 | Kajiyama | ......... | H02M 3/33573 |
| 2022/0107593 A1* | 4/2022 | Isomi | ................. | G03G 15/5008 |
| 2023/0155519 A1* | 5/2023 | Tawada | ..................... | H02J 3/40 363/95 |

* cited by examiner

POWER CONVERSION DEVICE, IMAGE FORMING APPARATUS, AND POWER CONVERSION CONTROL METHOD

CROSS-REFERENCE TO RELATED APPLICATION

This patent application is based on and claims priority pursuant to 35 U.S.C. § 119(a) to Japanese Patent Application No. 2022-046578, filed on Mar. 23, 2022, in the Japan Patent Office, the entire disclosure of which is hereby incorporated by reference herein.

BACKGROUND

Technical Field

Embodiments of this disclosure relate to a power conversion device, an image forming apparatus, and a power conversion control method.

Related Art

There is a switching power supply device in which a capacitor and a resistor are connected in parallel with an inductor of a filter in order to facilitate the damping of ringing when stopping a switching operation.

In terms of preventing the formation of an abnormal image (i.e., preventing abnormal discharge), however, it takes time for the ringing to damp out.

SUMMARY

In one embodiment of this invention, there is provided a power conversion device that includes, for example, a power conversion circuit, a memory, a voltage detection circuit, a current detection circuit, and a control circuit. The power conversion circuit controls a switching element based on a switching pulse signal to convert direct current power into alternating current power and output the alternating current power to a power supply target. The memory stores an alternating current phase difference. The voltage detection circuit detects an alternating current voltage effective value. The current detection circuit detects an alternating current effective value. Based on the alternating current phase difference, the alternating current voltage effective value, and the alternating current effective value, the control circuit stops output of the switching pulse signal at a time when an alternating current has a value of 0.

In one embodiment of this invention, there is provided an image forming apparatus that includes, for example, the above-described power conversion device and a photoconductor drum as the power supply target.

In one embodiment of this invention, there is provided an image forming apparatus that includes, for example, the above-described power conversion device, a photoconductor drum, a rotation distance monitoring circuit, a control device. In the power conversion device, in response to an input of an update instruction, the control circuit calculates an active current value based on the alternating current effective value, calculates the alternating current phase difference based on the alternating current effective value and the active current value, and updates the alternating current phase difference in the memory. The photoconductor drum is the power supply target. The rotation distance monitoring circuit calculates and monitors a rotation distance of the photoconductor drum. The control device outputs the update instruction when the rotation distance exceeds a particular rotation distance.

In one embodiment of this invention, there is provided a power conversion device that includes, for example, a power converter, a storage unit, a voltage detector, a current detector, and a controller. The power converter controls a switching device based on a switching pulse signal to convert direct current power into alternating current power and output the alternating current power to a power supply target. The storage unit stores an alternating current phase difference. The voltage detector detects an alternating current voltage effective value. The current detector detects an alternating current effective value. Based on the alternating current phase difference, the alternating current voltage effective value, and the alternating current effective value, the controller stops output of the switching pulse signal at a time when an alternating current has a value of 0.

In one embodiment of this invention, there is provided a power conversion control method that includes, for example, controlling a switching device based on a switching pulse signal to convert direct current power into alternating current power and output the alternating current power to a power supply target, storing an alternating current phase difference, detecting an alternating current voltage effective value, detecting an alternating current effective value, and based on the alternating current phase difference, the alternating current voltage effective value, and the alternating current effective value, stopping output of the switching pulse signal at a time when an alternating current has a value of 0.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
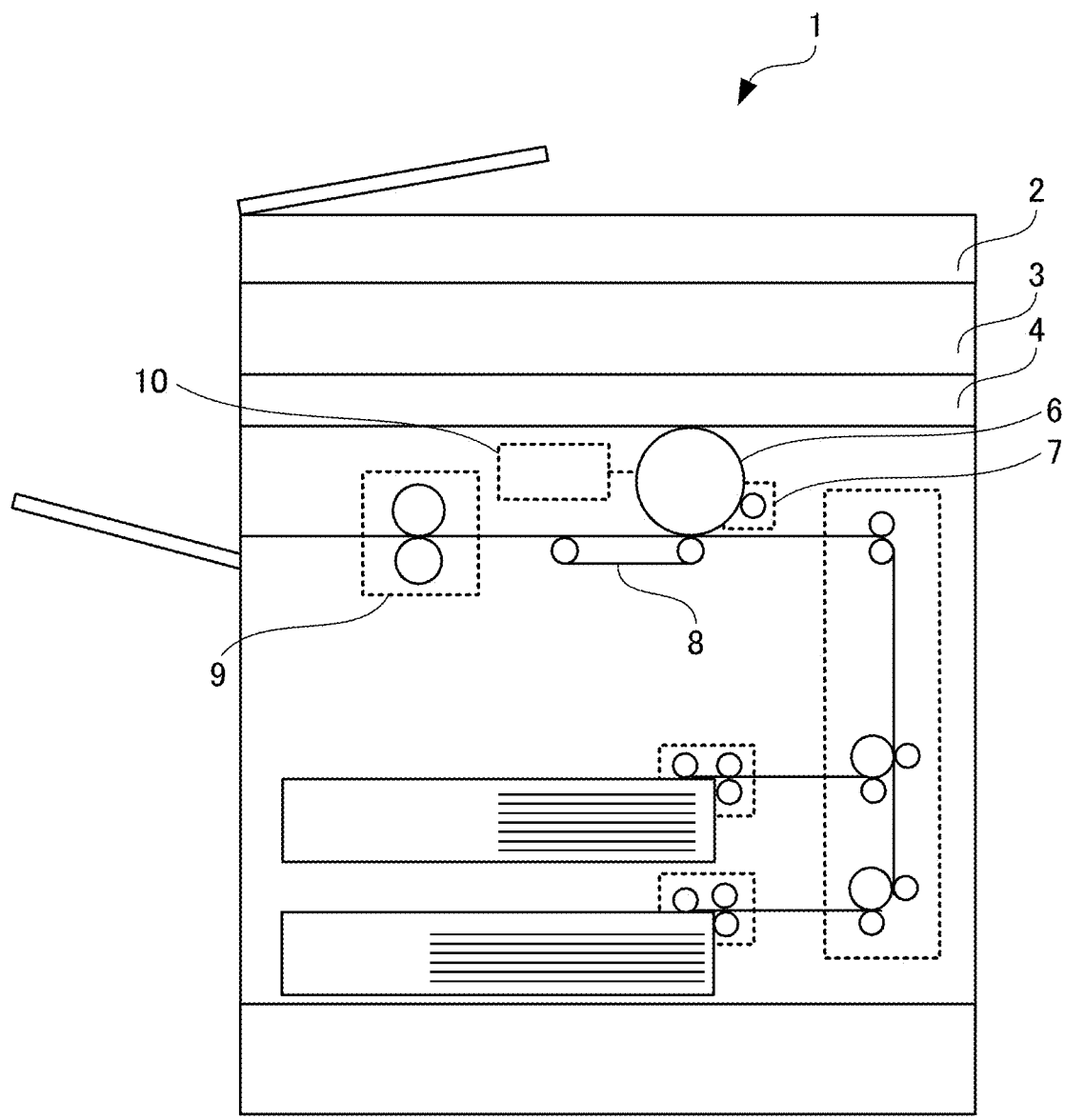
FIG. 1 is a partial cross-sectional view illustrating a schematic configuration of an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a partial cross-sectional view illustrating a schematic configuration of an image forming apparatus according to an embodiment of the present invention. As illustrated in FIG. 1, an image forming apparatus 1 is implemented as a digital multifunction peripheral (MFP).

That is, the image forming apparatus 1 has multiple functions such as a copier function, a printer function, a scanner function, and a facsimile (FAX) function. With an application switch key included in an operation device of the image forming apparatus 1, the function of the image forming apparatus 1 is sequentially switched to the copier function, the printer function, the scanner function, and the FAX function to select a desired function. When the copier function is selected, the image forming apparatus 1 is switched to copy mode. When the printer function is selected, the image forming apparatus 1 is switched to printer mode. When the scanner function is selected, the image forming apparatus 1 is switched to scanner mode. When the FAX function is selected, the image forming apparatus 1 is switched to FAX mode.

With reference to FIG. 1, a procedure of image formation in the image forming apparatus 1 will be briefly described with an example in which the image forming apparatus 1 is placed in the copier mode.

In the copier mode, a stack of documents are sequentially fed to an image reading device 3 by an automatic document feeder (ADF) 2, and image information is read from each of the documents by the image reading device 3. The read image information is converted into optical information by a writing unit 4 as a writing device via an image processing device. A photoconductor drum 6 is uniformly charged by a high-voltage power supply device 10 as a power conversion device, and is exposed with the optical information from the writing unit 4. Thereby, an electrostatic latent image is formed on the photoconductor drum 6. The electrostatic latent image on the photoconductor drum 6 is developed into a toner image by a development device 7. The toner image is transferred onto a transfer sheet by a transport belt 8, and is fixed on the transfer sheet by a fixing device 9. The transfer sheet is then ejected to the outside of the image forming apparatus 1.

Figure 2:
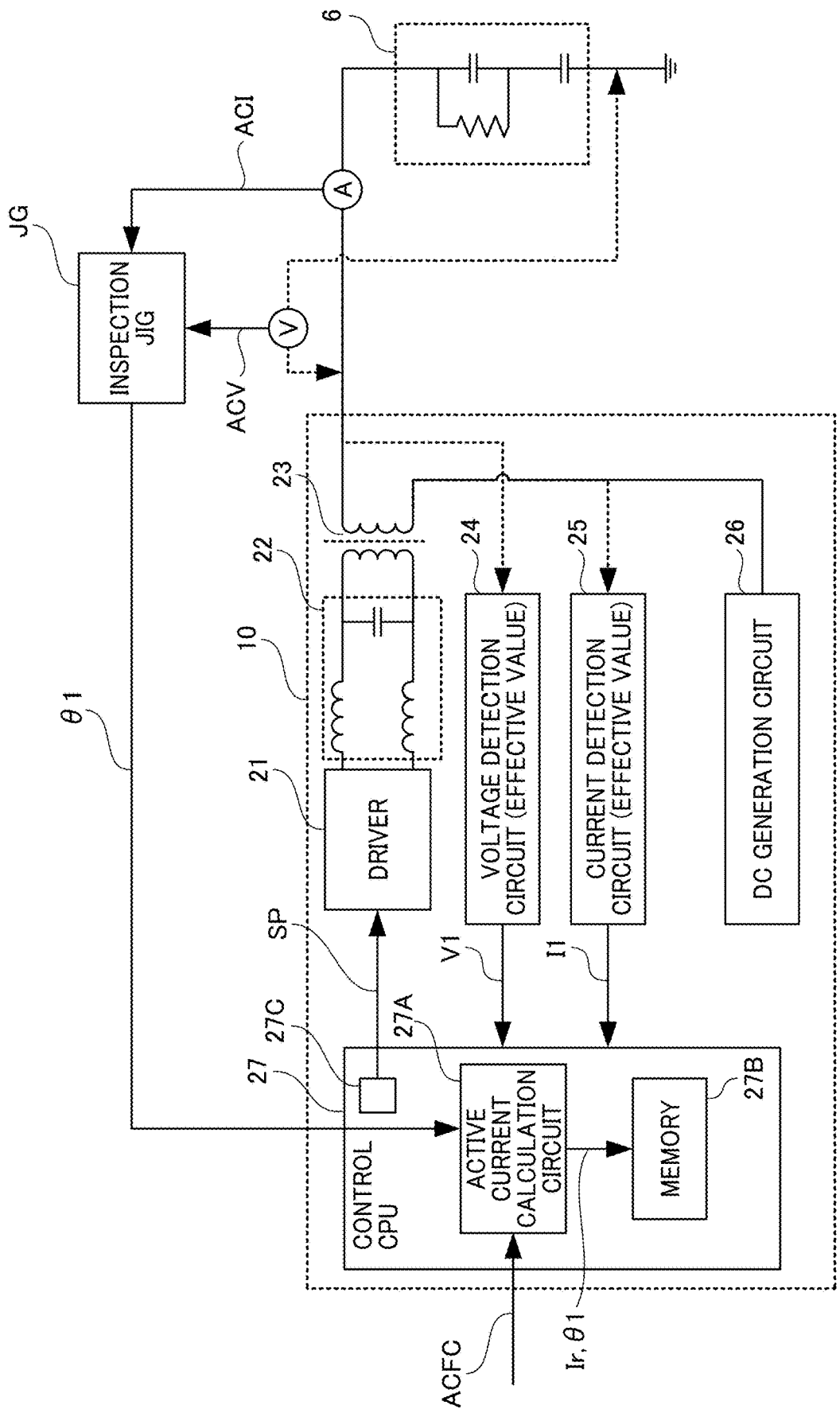
FIG. 2 is a block diagram illustrating a schematic configuration of a high-voltage power supply device in the image forming apparatus of the embodiment in a pre-shipment inspection.

FIG. 2 is a block diagram illustrating a schematic configuration of the high-voltage power supply device 10 in a pre-shipment inspection. The high-voltage power supply device 10 includes a driver 21, a smoothing circuit 22, a transformer 23, a voltage detection circuit 24, a current detection circuit 25, a direct current (DC) generation circuit 26, and a control central processing unit (CPU) 27. The driver 21, the smoothing circuit 22, and the transformer 23 will be collectively referred to as the power conversion circuit.

The driver 21 includes an inverter circuit. Based on a switching pulse signal SP input from the control CPU 27, the driver 21 converts DC power into square-wave alternating current (AC) power with a switching device, and outputs the square-wave AC power to the smoothing circuit 22. The switching device can be any desired switching element, and may be a metal oxide semiconductor (MOS) transistor, an insulated gate bipolar transistor (IGBT), a silicon carbide (SiC) transistor, or a gallium nitride (GaN) transistor, for example.

The smoothing circuit 22 smooths the square-wave AC power into AC power with a more analog waveform, and outputs the smoothed AC power to the transformer 23.

The transformer 23 converts the voltage of the AC power input to a primary coil thereof, and applies the converted voltage to the photoconductor drum 6 via a secondary coil thereof.

The voltage detection circuit 24 detects an AC output voltage effective value V1 of the transformer 23, and outputs the AC output voltage effective value V1 to the control CPU 27.

The current detection circuit 25 detects an AC output current effective value I1 of a current flowing through the secondary coil of the transformer 23, and outputs the AC output current effective value I1 to the control CPU 27.

The DC generation circuit 26 generates a DC voltage to be superimposed on the output voltage of the secondary coil of the transformer 23.

The control CPU 27 includes an active current calculation circuit 27A, a memory 27B, and a pulse pattern control circuit 27C. The active current calculation circuit 27A calculates an active current based on an input AC frequency command ACFC. The memory 27B stores various information. The pulse pattern control circuit 27C generates and outputs the switching pulse signal SP. Herein, the memory 27B functions as a storage device.

An inspection jig JG used in the pre-shipment inspection has a function of detecting an AC voltage ACV applied to the photoconductor drum 6, detecting an AC ACI supplied to the photoconductor drum 6, and calculating and outputting an AC phase difference θ1 to the control CPU 27.

An operation of the high-voltage power supply device 10 in the pre-shipment inspection will be described.

Based on the AC frequency command ACFC from a control device 1A (see FIG. 6) of the image forming apparatus 1, the control CPU 27 of the high-voltage power supply device 10 generates the switching pulse signal SP for the pulse pattern control circuit 27C to control the driver 21, and outputs the switching pulse signal SP to the driver 21.

Based on the switching pulse signal SP input from the control CPU 27, the driver 21 converts the DC power into the square-wave AC power with the inverter circuit thereof, and outputs the square-wave AC power to the smoothing circuit 22.

The smoothing circuit 22 smooths the square-wave AC power into the AC power with the more analog waveform, and outputs the smoothed AC power to the transformer 23.

The transformer 23 converts the voltage of the AC power input to the primary coil thereof, and applies the converted voltage to the photoconductor drum 6 via the secondary coil thereof.

The inspection jig JG thereby detects the AC voltage ACV applied to the photoconductor drum 6, detects the AC ACI supplied to the photoconductor drum 6, and calculates and outputs the AC phase difference $\theta 1$ to the active current calculation circuit 27A of the control CPU 27.

Figure 3:
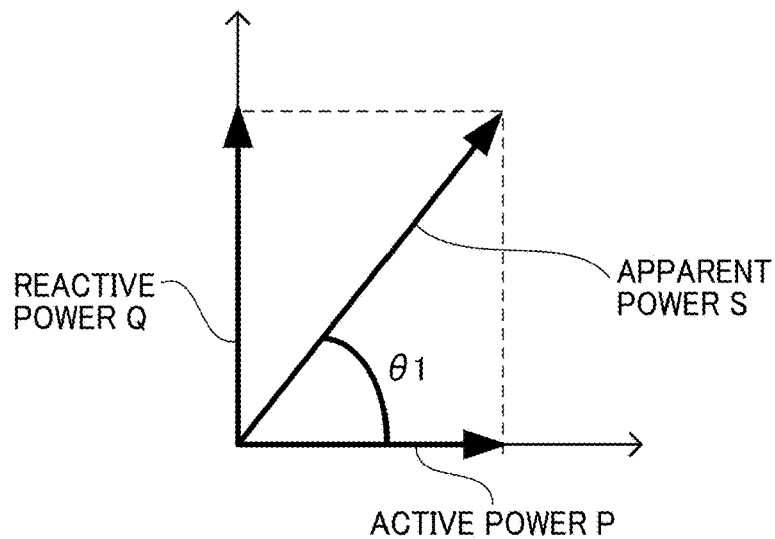
FIG. 3 is a graph illustrating the calculation of a first alternating current phase difference of the embodiment.
Figure 4:
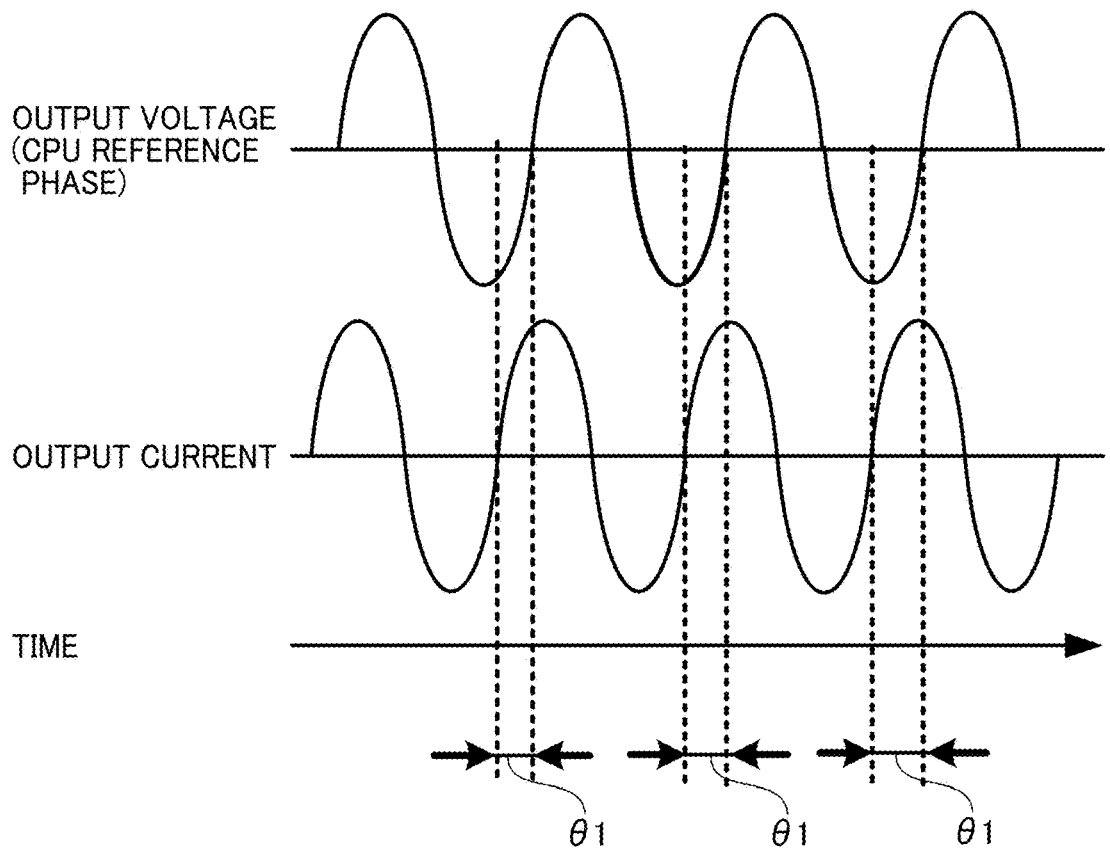
FIG. 4 is a graph illustrating the relationship between an alternating current output voltage, an alternating current output current, and the first alternating current phase difference of the embodiment.

FIG. 3 is a graph illustrating the calculation of the AC phase difference $\theta 1$. FIG. 4 is a graph illustrating the relationship between an AC output voltage, an AC output current, and the AC phase difference $\theta 1$.

More specifically, FIG. 3 illustrates the relationship between apparent power S, active power P, and reactive power Q of AC power and the AC phase difference $\theta 1$. The inspection jig JG calculates the apparent power S and the active power P based on the instantaneous value of the applied AC voltage ACV and the instantaneous value of the supplied AC ACI, and calculates the AC phase difference $\theta 1$ based on an equation: $\theta 1 = \cos^{-1}(P/S)$.

As illustrated in FIG. 4, the AC phase difference $\theta 1$ is represented as the difference between the zero-crossing point of the phase of the output voltage and the zero-crossing point of the phase of the output current.

While the inspection jig JG calculates the AC phase difference $\theta 1$, the voltage detection circuit 24 of the high-voltage power supply device 10 detects the AC output voltage effective value V1 of the transformer 23, and outputs the AC output voltage effective value V1 to the active current calculation circuit 27A of the control CPU 27.

Further, the current detection circuit 25 detects the AC output current effective value I1 of the current flowing through the secondary coil of the transformer 23, and outputs the AC output current effective value I1 to the active current calculation circuit 27A of the control CPU 27.

The active current calculation circuit 27A thereby calculates an active current Ir based on the AC output current effective value I1 input from the current detection circuit 25 and corresponding to the measurement time of the AC phase difference $\theta 1$. The active current calculation circuit 27A then stores the calculated active current Ir in the memory 27B.

Figure 5:
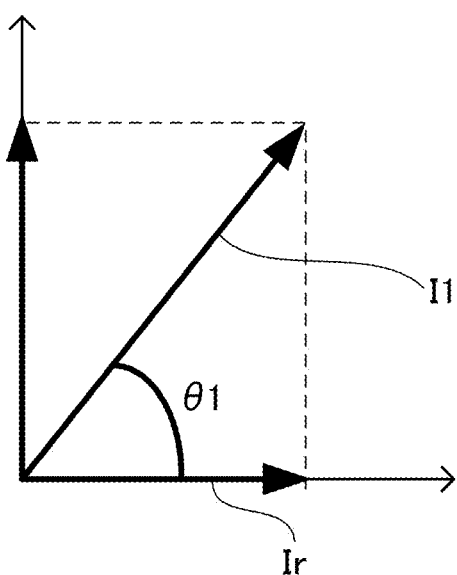
FIG. 5 is a graph illustrating the calculation of an active current of the embodiment.

FIG. 5 is a graph illustrating the calculation of the active current Ir. As illustrated in FIG. 5, the AC phase difference $\theta 1$ is expressed by an equation: $\theta 1 = \cos^{-1}(Ir/I1)$. The active current Ir is therefore expressed by an equation: $Ir = I1 * \cos \theta 1$.

Figure 6:
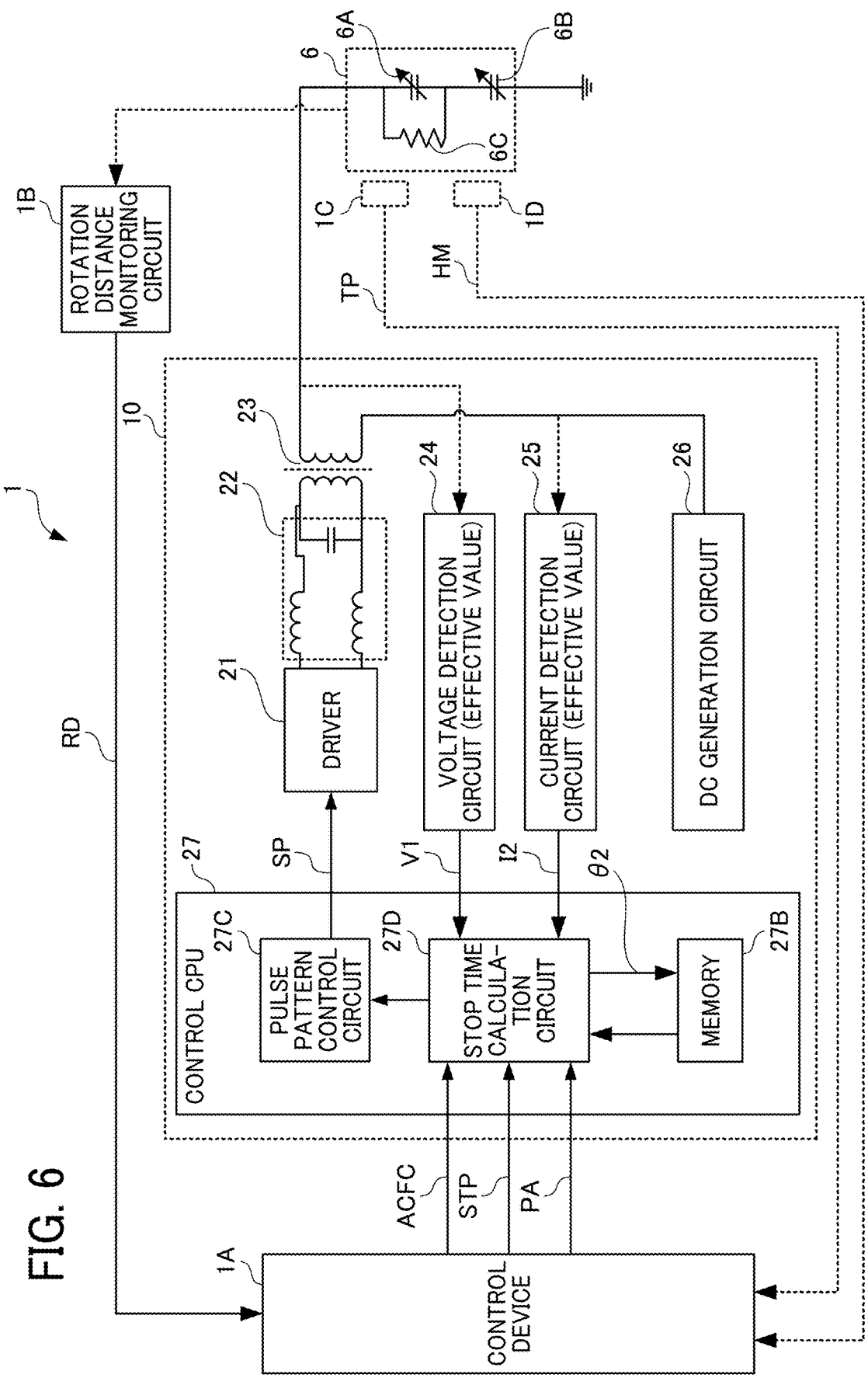
FIG. 6 is a block diagram illustrating a schematic configuration of the high-voltage power supply device of the embodiment in a regular operation.

FIG. 6 is a block diagram illustrating a schematic configuration of the high-voltage power supply device 10 in a regular operation. In FIG. 6, the components similar to those in FIG. 2 are designated with the same reference numerals. FIG. 6 is different from FIG. 2 in that the control CPU 27 of the high-voltage power supply device 10 includes a stop time calculation circuit 27D. Based on the AC frequency command ACFC, a stop command STP, and a phase correction mode transition command PA input from the control device 1A of the image forming apparatus 1, the stop time calculation circuit 27D calculates the time to stop the switching pulse signal SP and generates and outputs the stop command STP to the pulse pattern control circuit 27C.

FIG. 6 is also different from FIG. 2 in illustrating the control device 1A and a rotation distance monitoring circuit 1B of the image forming apparatus 1. The control device 1A controls the high-voltage power supply device 10. The rotation distance monitoring circuit 1B monitors a rotation distance RD (i.e., the driving time) of the photoconductor drum 6, and notifies the control device 1A of the rotation distance RD.

In this case, the photoconductor drum 6 may be modeled as capacitors 6A and 6B and a resistor 6C. The capacitors 6A and 6B are connected in series between a high-potential power supply (i.e., the output of the high-voltage power supply device 10) and a low-potential power supply (i.e., ground potential). The resistor 6C is connected in parallel with the capacitor 6A.

Further, the capacitors 6A and 6B may be considered as variable capacitors in which the capacitance changes with an increase in an accumulated rotation distance (i.e., the accumulated driving time) of the photoconductor drum 6. The change in the capacitance of the capacitors 6A and 6B results in a change in an AC phase difference $\theta 2$. The AC phase difference $\theta 2$ measured in the factory pre-shipment inspection is equal to the AC phase difference $\theta 1$.

A description will be given of the operation of the high-voltage power supply device 10 in the regular operation of the image forming apparatus 1. It is assumed here that the AC phase difference $\theta 2$ measured in the factory pre-shipment inspection, which is equal to the AC phase difference $\theta 1$, is stored in the memory 27B before the start of the regular operation.

To apply an AC voltage to the photoconductor drum 6, the control device 1A outputs the AC frequency command ACFC to the control CPU 27 of the high-voltage power supply device 10.

Thereby, based on the AC frequency command ACFC from the control device 1A of the image forming apparatus 1, the control CPU 27 of the high-voltage power supply device 10 generates the switching pulse signal SP for the pulse pattern control circuit 27C to control the driver 21, and outputs the switching pulse signal SP to the driver 21.

Based on the switching pulse signal SP input from the control CPU 27, the driver 21 converts the DC power into the square-wave AC power with the inverter circuit thereof, and outputs the AC power to the smoothing circuit 22.

The smoothing circuit 22 smooths the square-wave AC power into the AC power with the more analog waveform, and outputs the smoothed AC power to the transformer 23.

The transformer 23 converts the voltage of the AC power input to the primary coil thereof, and applies the converted voltage to the photoconductor drum 6 via the secondary coil thereof to form an image.

Then, when it is determined to be the time to complete the image formation based on the monitoring result of the rotation distance monitoring circuit 1B, the control device 1A outputs the stop command STP to the stop time calculation circuit 27D of the control CPU 27.

Thereby, the stop time calculation circuit 27D calculates the time to stop the output of the switching pulse signal SP based on the AC phase difference $\theta 2$ read from the memory 27B, the AC frequency command ACFC input from the control device 1A, the AC output voltage effective value V1 input from the voltage detection circuit 24, and an AC output current effective value I2 input from the current detection circuit 25. The stop time calculation circuit 27D then outputs the stop command STP to the pulse pattern control circuit 27C. Thereby, the pulse pattern control circuit 27C stops the output of the switching pulse signal SP.

The operation of stopping the output of the switching pulse signal SP will be described in more detail.

Figure 7:
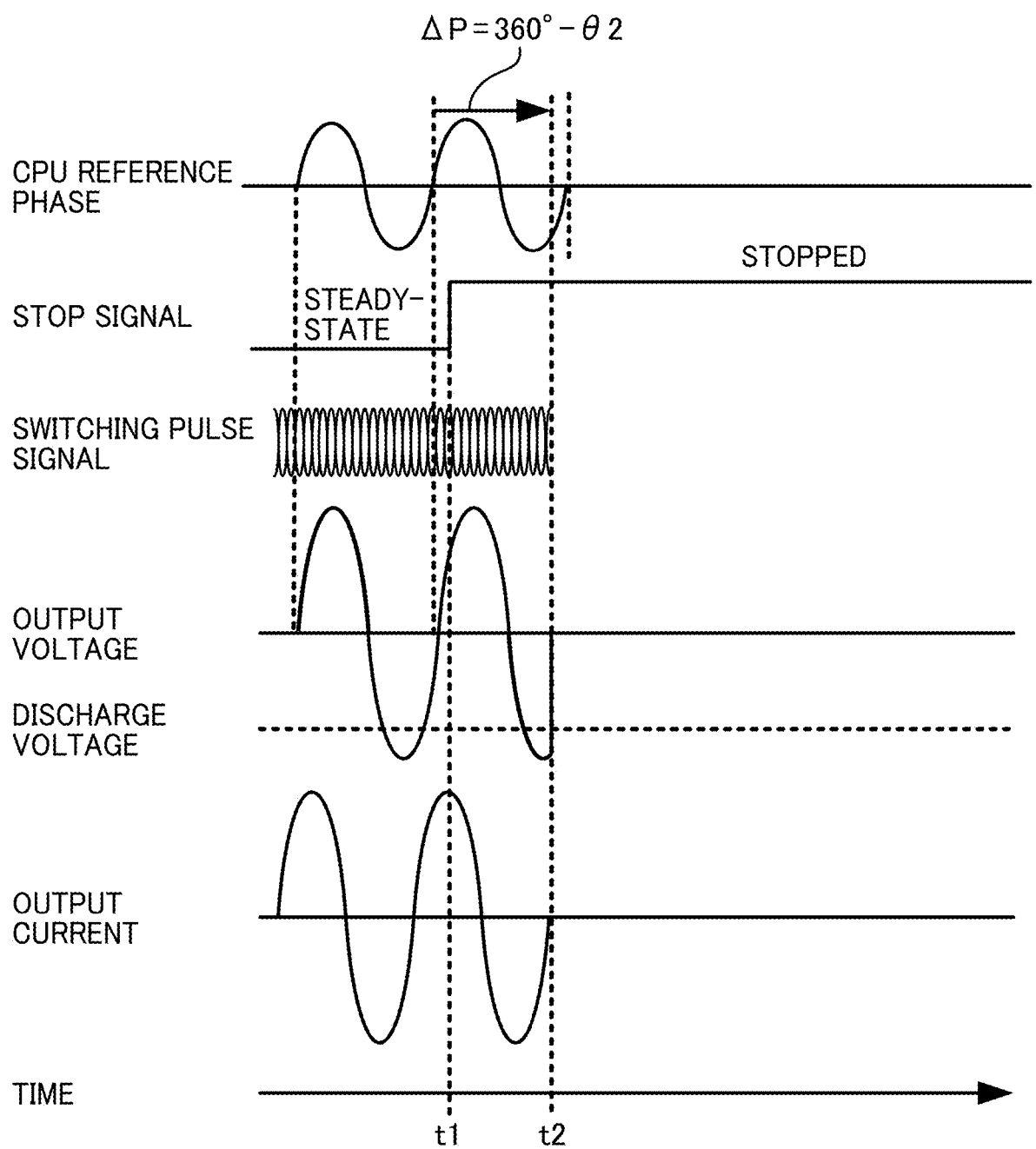
FIG. 7 is a timing chart of the embodiment.

FIG. 7 is a timing chart of the embodiment. It is assumed here that the high-voltage power supply device 10 is performing steady-state operation in the initial state, with the pulse pattern control circuit 27C of the control CPU 27 outputting the switching pulse signal SP.

When the stop command STP is input from the control device 1A of the image forming apparatus 1 at a time t1, the stop time calculation circuit 27D of the control CPU 27 reads the AC phase difference $\theta 2$ stored in the memory 27B. Then, the stop time calculation circuit 27D calculates a phase difference ΔP with reference to an AC voltage phase managed in the control CPU 27. That is, the stop time calculation circuit 27D calculates the phase difference ΔP, which corresponds to the difference between the zero-crossing point of the AC voltage phase managed in the control CPU 27 and the zero-crossing point of the output current. More specifically, the stop time calculation circuit 27D calculates the phase difference ΔP=360°−θ2.

Then, at a time t2 after the lapse of the time corresponding to the phase difference ΔP from the zero-crossing point of the AC voltage phase managed in the control CPU 27, the stop time calculation circuit 27D controls the pulse pattern control circuit 27C to stop the output of the switching pulse signal SP.

The time t2 is the time at which the AC has a value of 0 and ideally a phase of 0°. The time t2 is effectively the time at which the phase of the AC is in a particular phase range from 0°. The particular phase range may be ±30°.

Figure 8:
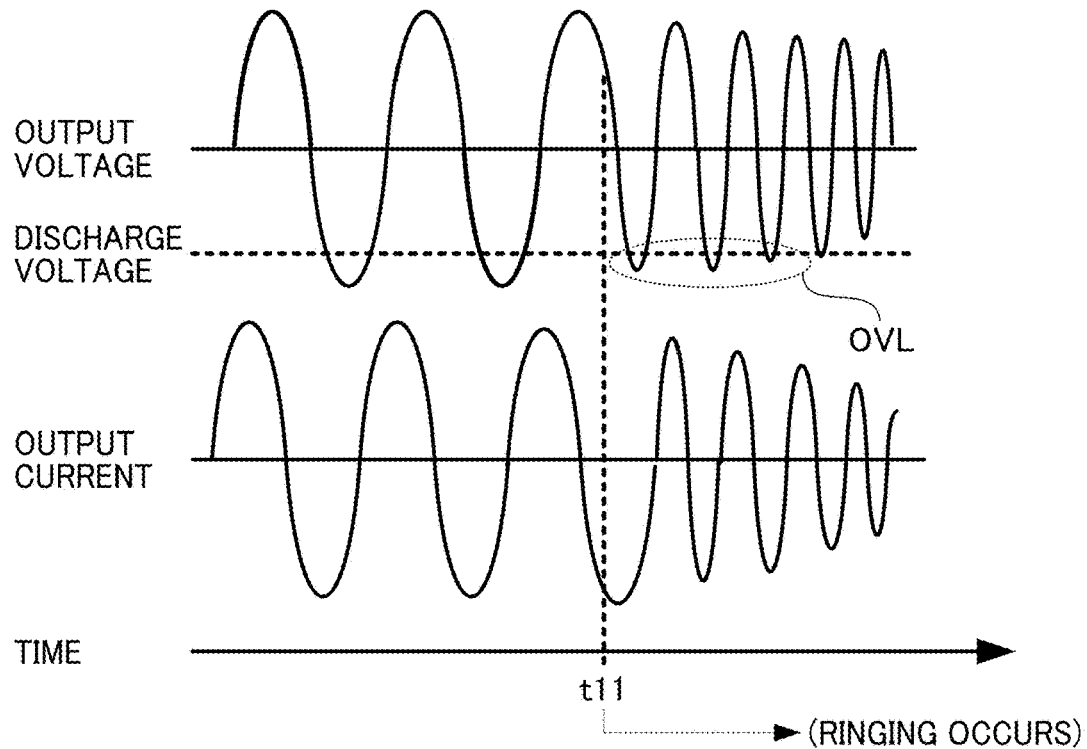
FIG. 8 is a timing chart of a related-art example.

FIG. 8 is a timing chart of a related-art example.

As in the related-art example of FIG. 8, if the output of the switching pulse signal SP is stopped at a time t11 at which the AC output current is not at the zero-crossing point, the AC output current is flowing when the output of the switching pulse signal SP is stopped. Consequently, the ringing occurs at the time t11 and thereafter, as illustrated in FIG. 8, due to residual energy of an inductance or capacitance component corresponding to the smoothing circuit 22 or the photoconductor drum 6.

Further, the AC output voltage exceeds a discharge voltage, as indicated by a broken-line oval OVL in FIG. 8, causing abnormal discharge and thus the formation of an abnormal image, for example. The abnormal discharge may further damage a mechanical component such as the photoconductor drum 6 and thus reduce the life of the component, for example.

According to the present embodiment, on the other hand, the time to stop the output of the switching pulse signal SP is set to the time at which the phase of the AC output current is in the particular phase range from 0°, as illustrated in FIG. 7.

That is, the output of the switching pulse signal SP is stopped at the time at which the AC output current is not flowing or is not considered to be flowing (i.e., the time t2 or a time close thereto).

Therefore, the AC output voltage is immediately brought to and maintained at a value of 0, causing no ringing, as illustrated in FIG. 8. Herein, the particular phase range is ±30° from 0° as the phase of the AC output current.

With this range, the residual energy of the inductance or capacitance component corresponding to the smoothing circuit 22 or the photoconductor drum 6 is reduced to the level not causing the ringing.

That is, the ringing in the AC output voltage and the AC output current is prevented in the process of stopping the output of the AC power in the high-voltage power supply device 10. Consequently, the formation of an abnormal image and the reduction of the life of a mechanical component such as the photoconductor drum 6 are prevented in the image forming apparatus 1.

An operation in a phase correction mode will be described.

When it is determined, based on the output of the rotation distance monitoring circuit 1B, that the accumulated rotation distance accumulated since the last transition to the phase correction mode exceeds a particular value, the control device 1A of the image forming apparatus 1 outputs the phase correction mode transition command PA to the stop time calculation circuit 27D. The initial transition to the phase correction mode takes place in the factory pre-shipment inspection.

Thereby, the stop time calculation circuit 27D calculates a new value of the AC phase difference θ2 to update the value of the AC phase difference θ2 stored in the memory 27B.

Figure 9:
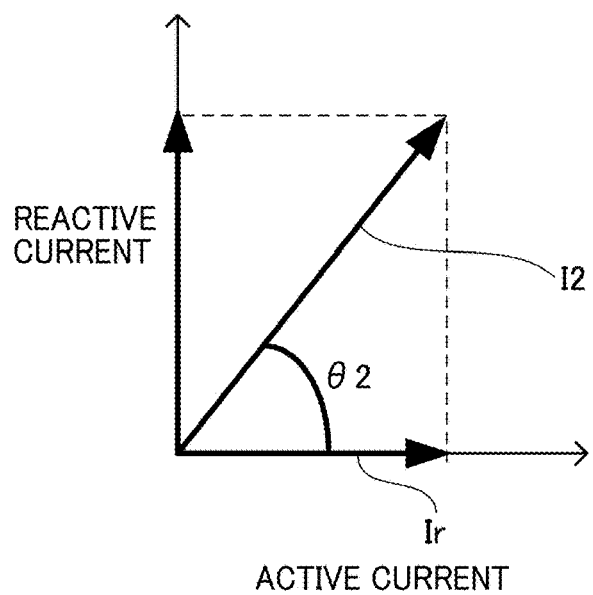
FIG. 9 is a graph illustrating the calculation of a second alternating current phase difference.

FIG. 9 is a graph illustrating the calculation of the AC phase difference θ2. Herein, the voltage detection circuit 24 of the high-voltage power supply device 10 detects the AC output voltage effective value V1 of the transformer 23, and outputs the AC output voltage effective value V1 to the active current calculation circuit 27A of the control CPU 27.

Further, the current detection circuit 25 detects the AC output current effective value I2 of the current flowing through the secondary coil of the transformer 23, and outputs the AC output current effective value I2 to the stop time calculation circuit 27D of the control CPU 27. Thereby, the stop time calculation circuit 27D calculates the active current Ir based on the AC output current effective value I2 input from the current detection circuit 25.

Then, based on the AC output current effective value I2 and the calculated active current Ir, the stop time calculation circuit 27D calculates a new value of the AC phase difference θ2 with an equation: $\theta 2 = \cos^{-1}(Ir/I2)$.

The control CPU 27 then records the calculated new value of the AC phase difference θ2 in the memory 27B to update the AC phase difference θ2 in the memory 27B. Thereby, the AC phase difference θ2 is continuously maintained at the optimal value: the stop time calculation circuit 27D stops the output of the switching pulse signal SP with the continuously updated AC phase difference θ2.

Consequently, a condition for more reliably stopping the output of the switching pulse signal SP when the AC output current is not flowing is maintained. Thereby, a condition for preventing the ringing in the AC output voltage waveform and the AC output current waveform is maintained for an extended period of time.

The above-described embodiment, therefore, prevents the ringing in the AC output voltage and the AC output current in the process of stopping the output of a switching power supply device, thereby preventing the formation of an abnormal image and the reduction of the life of a mechanical component such as a photoconductor drum.

The above description has been given of an example in which the transition to the phase correction mode takes place based on the accumulated rotation distance of the photoconductor drum 6. Since the capacitance characteristic of the photoconductor drum 6 also changes with temperature or humidity, the high-voltage power supply device 10 may be designed to transition to the phase correction mode when the temperature or humidity exceeds a particular threshold temperature or humidity.

More specifically, a temperature sensor 1C as a temperature detector may be provided near the photoconductor drum 6 as a power supply target. The temperature sensor 1C detects the temperature of the photoconductor drum 6 or the temperature around the photoconductor drum 6 and outputs a temperature detection signal TP to the control device 1A. If the detected temperature exceeds the particular threshold temperature and thus increases the error of the AC phase difference θ2, the control device 1A may update the AC phase difference θ2.

Alternatively, a humidity sensor 1D as a humidity detector may be provided near the photoconductor drum 6 as the power supply target. The humidity sensor 1D detects the humidity around the photoconductor drum 6 and outputs a humidity detection signal HM to the control device 1A. If the detected humidity exceeds a particular threshold humidity and thus increases the error of the AC phase difference θ2, the control device 1A may update the AC phase difference θ2.

In the above-described example, the high-voltage power supply device 10 updates the AC phase difference θ2 when instructed to transition to the phase correction mode by the control device 1A of the image forming apparatus 1. Alternatively, the high-voltage power supply device 10 may calculate the AC phase difference θ2 at a particular check time. Then, when the amount of change in the AC phase difference θ2 since the last update exceeds a particular threshold change amount, the high-voltage power supply device 10 may update the AC phase difference θ2.

Although the photoconductor drum 6 is used as a load in the above-described example, the present invention is similarly applicable to any structure (i.e., load with a capacitance component) in which the ringing occurs in the process of stopping the switching operation of the switching power supply device.

The image forming apparatus 1 of the present embodiment has a hardware configuration including a control device such as a CPU, storage devices such as a read only memory (ROM) and a random access memory (RAM), an external storage device such as a hard disk drive (HDD), a display device such as a display, and an input device such as an operation panel, and using a typical computer.

In the above-described embodiment, an image forming apparatus of the present invention is applied to the MFP with at least two functions out of the copier function, the printer function, the scanner function, and the FAX function, but is also applicable to an image forming apparatus such as a copier, a printer, a scanner, or a FAX machine.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A power conversion device comprising:
 a power conversion circuit configured to control a switching element based on a switching pulse signal to convert direct current power into alternating current power and output the alternating current power to a power supply target;
 a memory that stores an alternating current phase difference;
 a voltage detection circuit configured to detect an alternating current voltage effective value;
 a current detection circuit configured to detect an alternating current effective value; and
 a control circuit configured to:
 based on the alternating current phase difference, the alternating current voltage effective value, and the alternating current effective value, stop output of the switching pulse signal at a time when an alternating current has a value of 0, and
 in response to an input of an update instruction,
  calculate an activate current value based on the alternating current effective value,
  calculate the alternating current phase difference based on the alternating current effective value and an active current value, and
  update the alternating current phase difference in the memory with the calculated alternating current phase difference.

2. The power conversion device of claim 1, wherein the alternating current has the value of 0 at a time when a phase of the alternating current is in a particular phase range from 0°.

3. The power conversion device of claim 2, wherein the particular phase range is ±30°.

4. A power conversion device comprising:
 a power conversion circuit configured to control a switching element based on a switching pulse signal to convert direct current power into alternating current power and output the alternating current power to a power supply target;
 a memory that stores an alternating current phase difference;
 a voltage detection circuit configured to detect an alternating current voltage effective value;
 a current detection circuit configured to detect an alternating current effective value;
 a control circuit configured to, based on the alternating current phase difference, the alternating current voltage effective value, and the alternating current effective value, stop output of the switching pulse signal at a time when an alternating current has a value of 0;
 a driver connected to a direct current power supply, and to drive the switching element based on the switching pulse signal;
 a smoothing circuit configured to smooth an output of the driver; and
 a transformer to convert and output a voltage of an output of the smoothing circuit.

5. The power conversion device of claim 1, further comprising:
 a temperature sensor to detect a temperature of the power supply target or a temperature around the power supply target,
 wherein when the detected temperature exceeds a particular threshold temperature, the control circuit updates the alternating current phase difference.

6. The power conversion device of claim 1, further comprising:
 a humidity sensor to detect a humidity around the power supply target,
 wherein when the detected humidity exceeds a particular threshold humidity, the control circuit updates the alternating current phase difference.

7. The power conversion device of claim 1, wherein the control circuit:
 calculates the alternating current phase difference, and
 when an amount of change in the alternating current phase difference since last update of the alternating current phase difference exceeds a particular threshold change amount, updates the alternating current phase difference stored in the memory with the calculated alternating current phase difference.

8. An image forming apparatus comprising:
 the power conversion device of claim 1; and
 a photoconductor drum as the power supply target.

9. The image forming apparatus of claim 8, further comprising:
 a rotation distance monitoring circuit configured to calculate and monitor a rotation distance of the photoconductor drum; and control circuitry configured to output the update instruction when the rotation distance exceeds a particular rotation distance.

10. A power conversion control method comprising:
controlling a switching device based on a switching pulse signal to convert direct current power into alternating current power and output the alternating current power to a power supply target;
storing an alternating current phase difference;
detecting an alternating current voltage effective value;
detecting an alternating current effective value; and
based on the alternating current phase difference, the alternating current voltage effective value, and the alternating current effective value, stopping output of the switching pulse signal at a time when an alternating current has a value of 0;
in response to an input of an update instruction, the method further comprising:
calculating an active current value based on the alternating current effective value;
calculating the alternating current phase difference based on the alternating current effective value and the active current value; and
updating the stored alternating current phase difference with the calculated alternating current phase difference.

11. The power conversion control method of claim 10, further comprising:
detecting a temperature of the power supply target or a temperature around the power supply target; and
when the detected temperature exceeds a particular threshold temperature, updating the alternating current phase difference.

12. The power conversion control method of claim 10, further comprising:
detecting a humidity around the power supply target; and
when the detected humidity exceeds a particular threshold humidity, updating the alternating current phase difference.

13. The power conversion control method of claim 10, further comprising:
calculating the alternating current phase difference; and
when an amount of change in the alternating current phase difference since last update of the alternating current phase difference exceeds a particular threshold change amount, updating the stored alternating current phase difference with the calculated alternating current phase difference.

* * * * *